(No Model.) 2 Sheets—Sheet 1.
L. B. WILSON.
CHURN.
No. 280,890. Patented July 10, 1883.
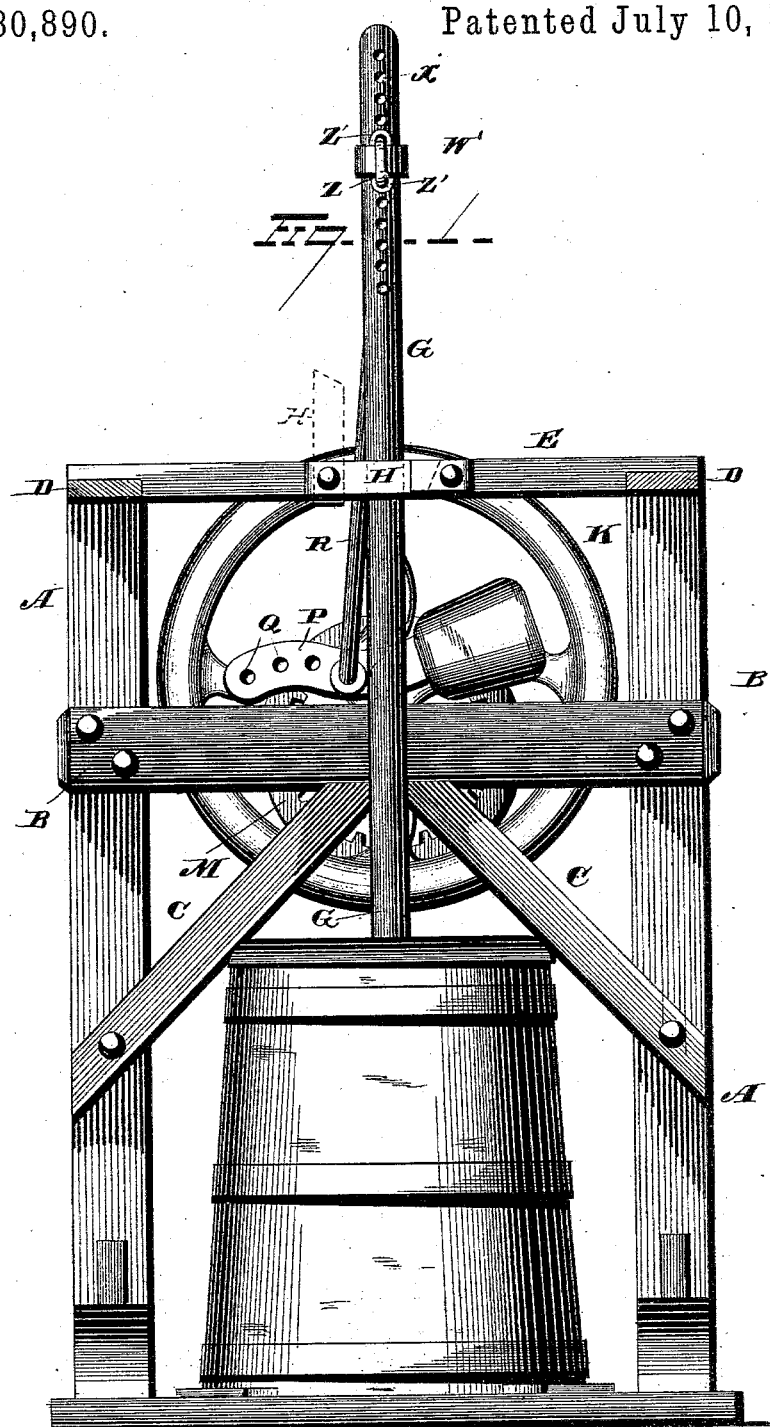
WITNESSES
E. Nottingham,
G. J. Downing.
INVENTOR
L. B. Wilson.
By H. A. Symons,
Attorney

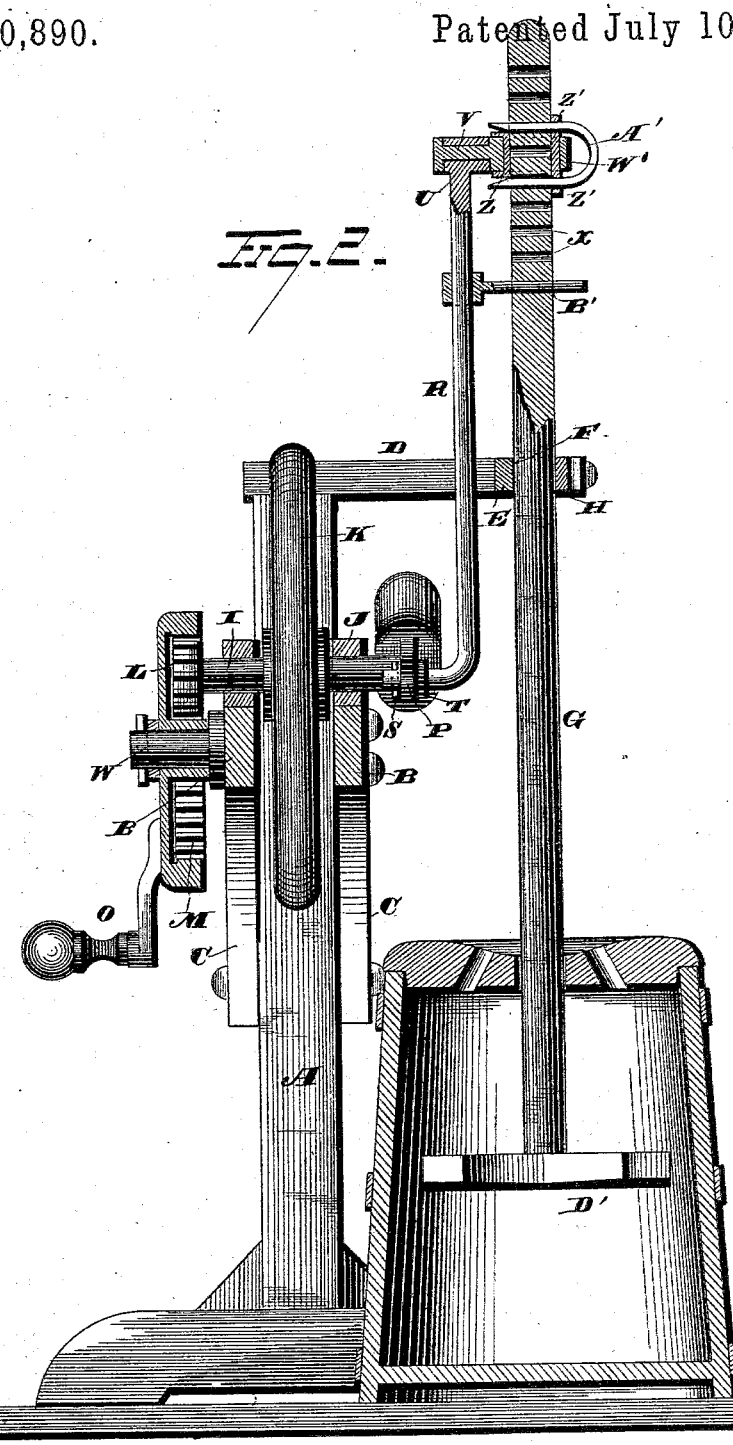

UNITED STATES PATENT OFFICE.

LISTON B. WILSON, OF ZANESVILLE, OHIO.

CHURN.

SPECIFICATION forming part of Letters Patent No. 280,890, dated July 10, 1883.

Application filed March 9, 1883. (No model.)

*To all whom it may concern:*

Be it known that I, LISTON B. WILSON, of Zanesville, in the county of Muskingum and State of Ohio, have invented certain new and useful Improvements in Churns; and I do hereby declare the following to be a full, clear, and exact description of the invention, such as will enable others skilled in the art to which it appertains to make and use the same.

My invention relates to an improvement in churns, the object being to produce a combined reciprocating and rotary action churn which shall combine simplicity and cheapness of construction with durability and efficiency in use.

With these ends in view my invention consists in certain details of construction and combinations of parts, as will be hereinafter described, and pointed out in the claims.

In the accompanying drawings, Figure 1 is a view in front elevation of a churn constructed in accordance with my invention, and Fig. 2 is a view thereof in vertical cross-section.

The devices for actuating the dasher of the churn are embodied in a structure consisting, essentially, of a frame composed of uprights A, to the outer faces of which cross-beams B are secured, as herein shown, and supported by diagonal braces C. Beams D, attached to the upper ends of and projecting forward from the uprights A, support a cross-beam, E, which is provided with an open recess, F, adapted to receive the dash-rod G, the same being held in place by the latch H. A short shaft, I, journaled in bearings J, mounted upon the beams B, supports a fly-wheel, K, which is located between the said beams. A pinion, L, keyed to the said shaft J, meshes with the leaves of an intaglio gear-wheel, M, which is mounted on a short axle, W, and which is rotated by a handle, O, secured to its outer face. A weighted crank-arm, P, secured to the forward end of the shaft I, is provided with a series of perforations, Q, into which the curved lower end of the pitman R is interchangeably inserted, being held in place by a pin, S, and bearing T. The pitman is surmounted by a sleeve, U, which receives the stem V of the collar W', the same encircling the upper end of the dash-rod G, which is provided with a series of perforations, X. An auxiliary collar located within the collar W', and held in place therein by lips Z, is provided with perforated flanges Z', through which the staple A' is passed in securing the collar W' to the dash-rod G. The said auxiliary collar, which is thus rigidly secured to the dash-rod, constitutes a bearing between the same and the collar W'. A pin, B', provided with a perforated head and mounted upon the pitman, is adapted to be interchangeably inserted in the perforations of the dash-rod. The dasher D' is composed of two or more strips provided with not only vertical but also with transverse holes, whereby a more perfect agitation of the cream is obtained. Inasmuch as the pitman is attached to the dash-rod at two points, the latter is not only vertically reciprocated, but also has a slight rotary motion, the same being particularly efficacious in the separation of the butter globules in the cream. The degree of reciprocating and vertical adjustment imparted to the dash-rod is regulated with reference to the amount of cream to be churned, the reciprocating motion being varied by adjusting the pitman in the crank-arm or by moving the collar W' upon the dash-rod, while, on the other hand, the rotary motion of the rod is proportioned to the distance which separates the said collar W' and the pin B'. If these three means of adjustment do not offer a sufficient range of adjustment, the cross-beams B may be raised or lowered on the uprights A.

I am aware that the pitman of a churn has been pivoted upon a pin secured to a band attached to the dash-rod. Above the pivotal point the pitman is enlarged to form an elongated slot, within which projects a pin attached to the dash-rod. This construction of parts does not afford the wide adjustment secured by my improvement, and, further, causes a quick rotary movement at the termination of each up-and-down stroke instead of a gradual rotary movement throughout the entire portion of the up-and-down stroke, as in my improvement.

I would have it understood that I do not limit myself to the exact construction herein shown and described, but that I hold myself at liberty to make such slight changes and alterations as fairly fall within the spirit and scope of my invention.

Having fully described my invention, what I claim as new, and desire to secure by Letters Patent, is—

1. In a churn, the combination, with the crank-arm and dash-rod, of a pitman connected at its lower end to the crank-arm, a pin connected at one end to the pitman and adapted to be adjustably secured to the dash-rod, and a collar adjustably secured to the dash-rod above said pin and provided with a bearing, upon which is pivoted the upper end of the pitman, substantially as set forth.

2. In a churn, the combination, with a weighted crank-arm provided with a series of perforations, means to rotate said crank-arm, and a dash-rod, the upper end of which is provided with a series of perforations, of a pitman attached to said crank-arm, a collar pivotally secured to the top of the pitman and adapted to encircle and to be vertically adjusted on the dash-rod, an auxiliary bearing-collar located within the collar aforesaid and adapted to be adjusted with it, and a pin mounted on the pitman and adapted to be interchangeably inserted in the perforations of the dash-rod, substantially as set forth.

In testimony whereof I have signed this specification in the presence of two subscribing witnesses.

LISTON B. WILSON.

Witnesses:
W. H. JOHNSON,
H. C. HUGHES.